United States Patent [19]
Nguyen et al.

[11] Patent Number: 5,445,202
[45] Date of Patent: Aug. 29, 1995

[54] RADIAL PLY TIRE WITH SPECIFIED BEAD PORTION FITMENT TO DESIGN RIM

[75] Inventors: Gia V. Nguyen, Arlon, Belgium; Roland A. Terver, Ettelbruck, Luxembourg

[73] Assignee: The Goodyear Tire & Rubber Company, Akron, Ohio

[21] Appl. No.: 114,797

[22] Filed: Aug. 31, 1993

[51] Int. Cl.$^6$ .................. B60C 3/00; B60C 15/024
[52] U.S. Cl. .................. 152/454; 152/525; 152/539; 152/544
[58] Field of Search ............. 152/454, 539, 544, 525, 152/375, 378 R, 379.3–379.5, 380, 381.3, 381.4

[56] References Cited

U.S. PATENT DOCUMENTS

| | | | |
|---|---|---|---|
| 3,910,336 | 10/1975 | Boileau . | |
| 4,967,817 | 11/1990 | Boehmer et al. | 152/454 |
| 4,998,575 | 3/1991 | Kanamaru | 152/544 |
| 5,000,239 | 3/1991 | Brayer et al. | 152/454 |
| 5,121,781 | 6/1992 | Ueyoko et al. | 152/544 |
| 5,125,445 | 6/1992 | Watanabe | 152/454 |
| 5,151,141 | 9/1992 | Lunieski et al. . | |

FOREIGN PATENT DOCUMENTS

| | | | |
|---|---|---|---|
| 0129675 | 1/1985 | European Pat. Off. . | |
| 0498214 | 8/1992 | European Pat. Off. . | |
| 0543639 | 5/1993 | European Pat. Off. . | |
| 1195309 | 11/1959 | France . | |
| 2366940 | 5/1978 | France . | |
| 2415016 | 8/1979 | France . | |
| 0077302 | 6/1977 | Japan . | |
| 0151406 | 9/1982 | Japan | 152/544 |
| 0006206 | 1/1990 | Japan . | |
| 4126605 | 4/1992 | Japan . | |
| 9201578 | 2/1992 | WIPO . | |
| 9413498 | 6/1994 | WIPO . | |

*Primary Examiner*—Adrienne C. Johnstone
*Attorney, Agent, or Firm*—David L. King

[57] ABSTRACT

An improved radial ply pneumatic passenger tire 30 having a conical shaped lower sidewall 21B in the unloaded uninflated and mounted state. The angular relationships relative the design rim flange 44 and the bead 33,533,63 permit the lower sidewall 21B of the tire 30 to rotate slightly upon mounting to the design rim 40, thereby improving the stiffness and handling characteristics of the tire 30.

7 Claims, 9 Drawing Sheets

RADIAL PLY TIRE WITH SPECIFIED BEAD PORTION FITMENT TO DESIGN RIM

BACKGROUND OF THE INVENTION

This invention relates to pneumatic radial ply tires and the interrelationship between the tire and its design rim.

Historically, with the introduction of the tubeless type tire, the design fitment of the bead portions of the tire to the design rim has increased in significance. This fitment insures that the tire remains air tightly sealed and securely fixed to the rim during vehicle use.

The typical rim has a bead seat and a rim flange that defines the contact zone with the tire bead. The tire bead has an annular surface between the bead heel and bead toe that upon assembly to the rim contacts the bead seat. The bead also has an annular surface radially outwardly of the bead heel, this annular surface contacts the rim flange when the tire is mounted and inflated on the rim.

The prior art teaches the use of a rim with cylindrical or very slightly conical bead seats. Typically such bead seats were inclined at an angle of 5° relative to the axis of rotation of the tire. To ensure a proper fitment, the tire beads had an annular surface having a similar 5° inclination relative to the axis of rotation, the beads having a slightly smaller diameter than the rim seat, thus upon assembly, a snug interference fit would be achieved.

As a later development, the radially innermost flexible toe portion of the tire between the toe and the annular tensile member comprised an inclined surface about 5° greater than the rim seat. This added interference created by the angular variation facilitated sealing the tire.

The prior art tires had beads with a surface radially outwardly of the bead heel. This surface was designed to contact the rim flange, both the rim flange and this axially and radially outwardly surface being oriented at 90° relative to the wheel axis. This area being under pressure while the tire is inflated contacts the rim flange essentially fastening the tire on the rim.

The prior art tires essentially relied on the rim seat and flange orientation to establish the shape and orientation of the bead, with the exception being the flexible toe portion of the bead.

It has been discovered that a tire made according to the present invention, having unique bead surfaces for contacting the rim can result in a tire having improved lower sidewall stiffness, better rolling resistance and improved comfort.

SUMMARY OF THE INVENTION

An improved radial ply pneumatic tire 30 is described. The tire 30 has an axis of rotation, a pair of axially-spaced beads 33,53,63 respectively including annular tensile numbers 35, and at least one radial ply 36 extending between the annular tensile members 35 of the respective beads 33,53,63. The beads 33,53,63 each have a heel 22B portion and a toe portion 22A designed to engage a design rim 40 having a bead seat 42 and a design rim width (D) as specified by the industry standards in effect in the location in which the tire is manufactured.

The improved tire 30 is characterized by a first annular surface 23 between the heel 22B and toe 22A of each bead 33,53,63 and a second annular surface 24A radially outwardly from each bead heel 22B. The first annular surface 23 is in contact with the bead seat 42 of the design rim 40 when the tire 30 is mounted and inflated to normal pressure. The first annular surface 23, when the tire is unmounted, forms an average angle $\beta$ with the axis of the tire, when the beads 33,53,63 are axially spaced a distance D equal to the design rim width. The average angle $\beta$ is at least three degrees greater than the angle formed between the mating bead seat 42 of the design rim 40 and the axis of the tire. The second annular surface 24A is in contact with an annular flange portion 44 of the design rim 40 when the tire 30 is mounted and inflated to normal pressure, The second annular surface 24A of the unmounted tire is inclined, relative to a plane P perpendicular to the axis of rotation, at an angle $\alpha$ at least three degrees less than the angle formed between the rim flange 44 and the plane P.

A portion of the first annular surface 23, when the beads are to the design rim width, is located between a plane C perpendicular to the axis of the tire and passing through the center of the annular tensile member 35, and a plane T tangent to the axially outer side of the annular tensile member 35 and perpendicular to the axis of rotation of the tire.

Preferably, the angle $\beta$ is in the range of 8° and 25° relative to a line parallel to the axis of rotation. Most preferably $\beta$ is about 5° greater than the angle formed between the bead seat 42 of the design rim 40 and a line parallel to the axis.

Preferably, the angle $\alpha$ is in the range of 3° to 20° relative to the plane P. Most preferably the angular difference between the first annular surface 23 and the design rim 40 is substantially equal to the angular difference between the second surface 24A and the rim flange 44. Upon assembly and inflation of the tire 30 to the rim 40, the beads 33,53,63 rotate such that the second surface 24A and the rim flange 44 are in contact.

In a preferred embodiment of the invention, the tire 30 has a pair of lower sidewalls 21B having substantially constant thickness over a majority of its length and a radius of curvature (R) in the range of 100% of the maximum section width to $\infty$. Preferably, the lower sidewalls 21B over a majority of its length forms a conical surface in the tires unmounted state. The conical surface forms an included angle in the range of 30° to 60° relative to the axis of rotation, preferably the included angle is 45°.

DEFINITIONS

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" or "Reinforcing Belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Design rim" means a rim having a specified configuration and width. For the purposes of this Specification, the design rim and design rim width are as specified by the industry standards in effect in the location in which the tire is made. For example, in the United States, the design rim is as specified by the Tire and Rim Association. In Europe, the rim is as specified in the European Tire and Rim Technical Organisation—Standards Manual and the term design rim means the same as the standard measurement rims. In Japan, the standard organization is The Japan Automobile Tire Manufacturer's Association.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Ply" means a continuous layer of rubber-coated parallel cords.

"Radial" and "radially" means directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of a sidewall just below the tread edge. Affects cornering.

"Sidewall" means that portion of a tire between the tread and the bead.

"Tread width" means the arc length of the tread surface in the axial direction, that is, in a plane passing through the axis of rotation of the tire.

DETAILED DESCRIPTION OF THE DRAWINGS

DETAILED DESCRIPTION OF THE INVENTION

Figure 1:
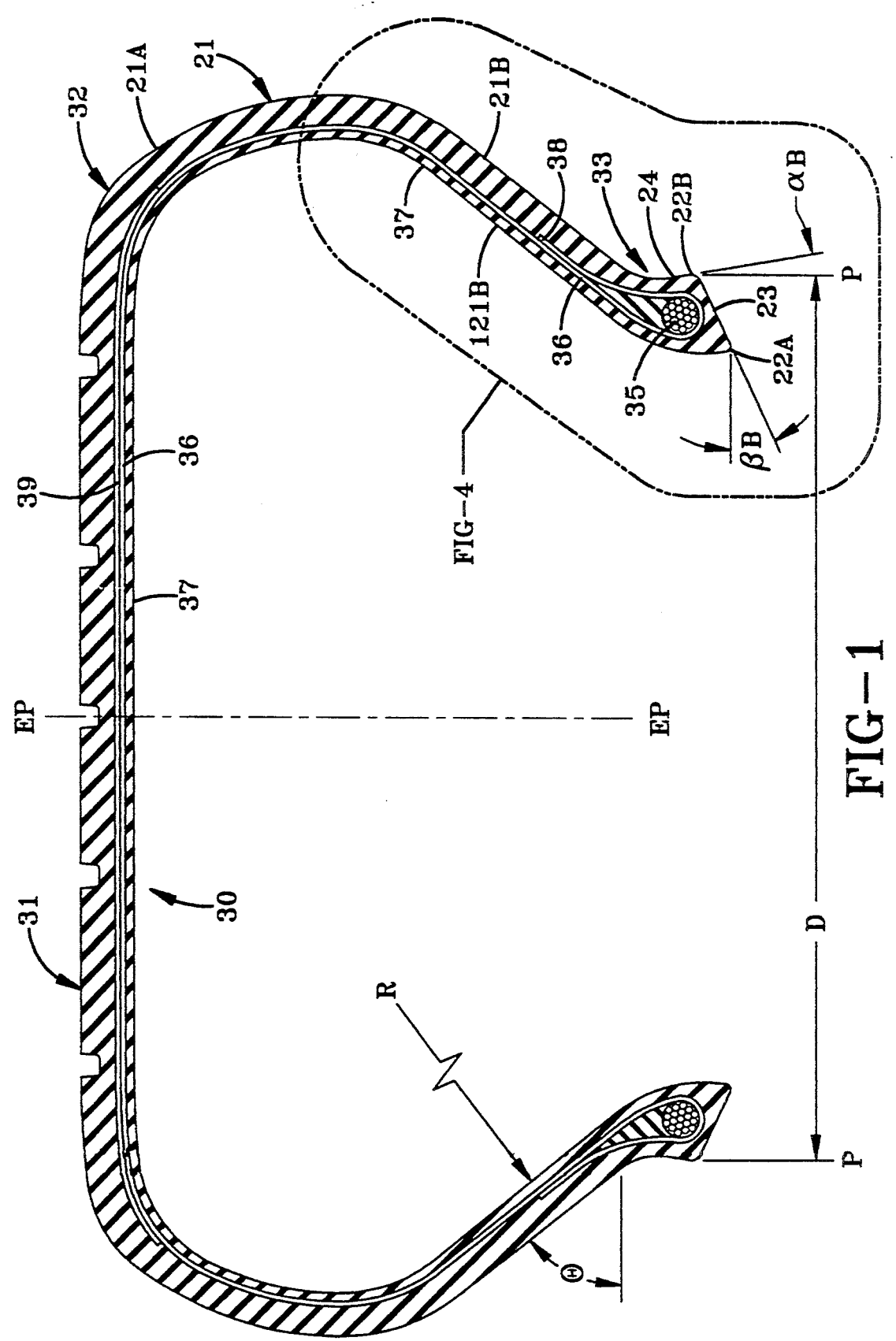
FIG. 1 is a cross-sectional view of the preferred tire made in accordance with the invention.

Referring to FIG. 1, there is illustrated a cross sectional view of a tire made in accordance with the present invention. In the particular embodiment, the tire 30 is a low aspect ratio passenger tire. As shown, the beads 33 are spaced axially a distance equal to the specified design rim width.

The tire 30 is provided with a ground-engaging tread portion 31 which terminates in the shoulder portions 32 at the lateral edges of the tread. Radially outer sidewall portion 21 extends from shoulder portion 32 and terminates in the bead portion 33 having an annular inextensible annular tensile member 35. The tire 30 is further provided with a carcass reinforcing structure 36 which extends from the tensile member 35 through the sidewall portion 21, the tread portion 31, the opposite sidewall portion 21 down to the opposite tensile member 35. The turnup ends 38 of the carcass reinforcing structure 36 are wrapped about the tensile members 35. The tire 30 may include a conventional innerliner 37 forming the inner peripheral surface of the tire 30 if the tire is to be of the tubeless type.

Placed circumferentially about the radially outer surface of the carcass reinforcing structure 36, beneath the tread portion 31, is a tread reinforcing belt structure 39. In a preferred embodiment, the belt structure 39 comprises two single cut belt plies and the cords of the belt plies are oriented at an angle ranging between 17° and 25° with respect to the equatorial plane of the tire. The cords of one belt ply are disposed in an opposite direction to the equatorial plane and from that of the cords of the other belt ply. However, the belt structure 39 may comprise any number of belt plies of any desired configuration and the cords may be disposed at any desired angle.

The carcass reinforcing structure 36 includes at least one reinforcing ply structure comprising each one layer of parallel cords. The cords of the reinforcing ply structure 36 are oriented at an angle of at least 75° with respect to the equatorial plane EP of the tire 30. The cords reinforcing the carcass ply may be of any material normally used for cord reinforcement of rubber articles, for example, and not by way of limitation, rayon, nylon and polyester. The reinforcing ply structure 36 has its turnup ends 38, which wrap about the bead core 35, located at about 35% of the section height of the tire.

Before mounting the tire 30 on a rim and inflating it, it has the shape imparted to it by the mold. The most striking difference with a prior art tire is that the lower radially outer sidewall portion 21B and by way of consequence also the adjacent lower, radially inner, sidewall portion 121B, is substantially flat. Furthermore the second annular surface 24 forms with the equatorial plane EP of the tire an angle $\alpha B$ of about 10°. The first annular surface 23 makes an angle $\beta B$ of about 15° with a line parallel to the axis of rotation of the tire; the increased inclination of the axially inner portion of the bead seat mentioned above, has not been represented.

Figure 5:
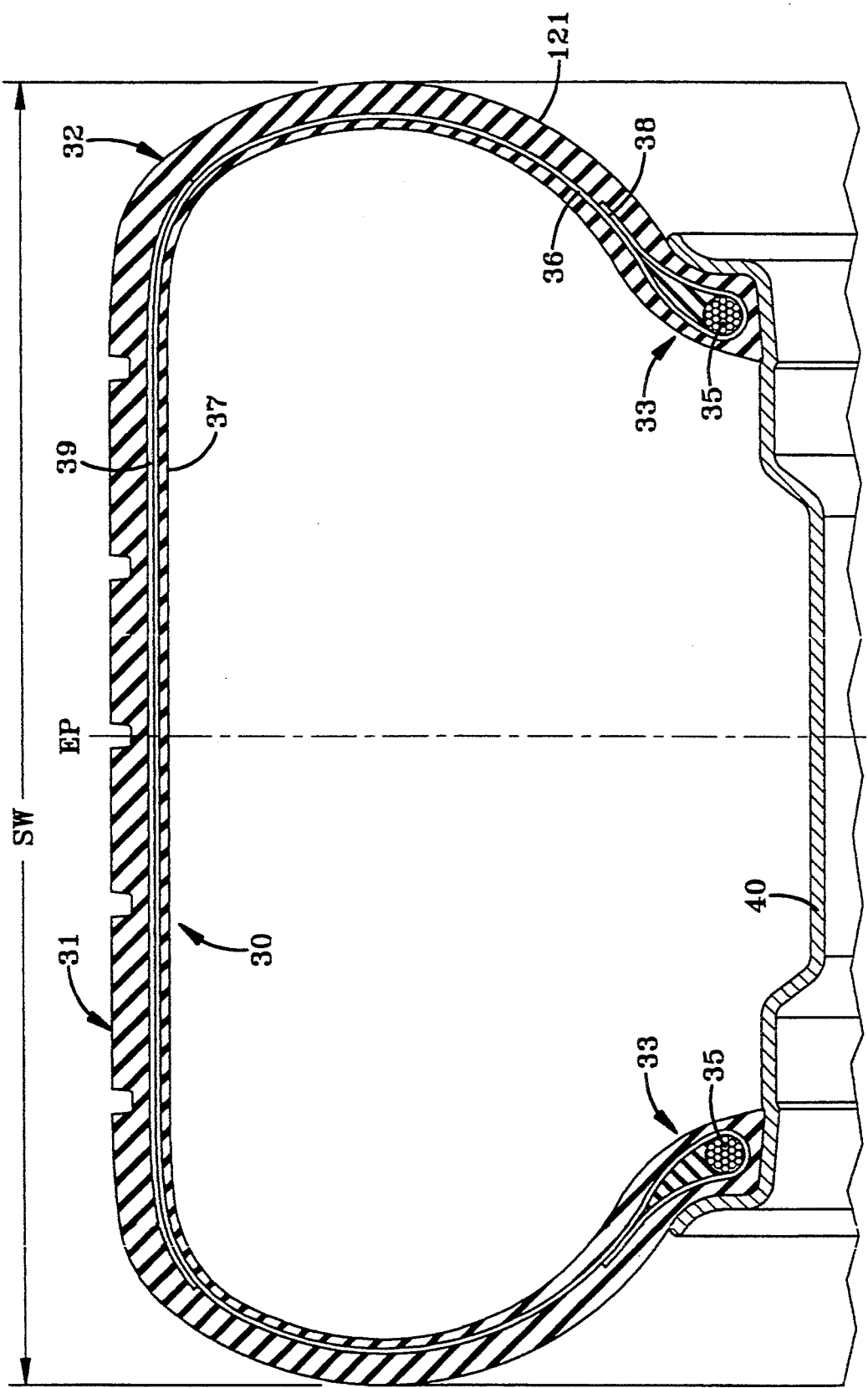
FIG. 5 is a cross sectional view of the preferred tire according to the present invention mounted and inflated on a design rim.
Figure 5A:
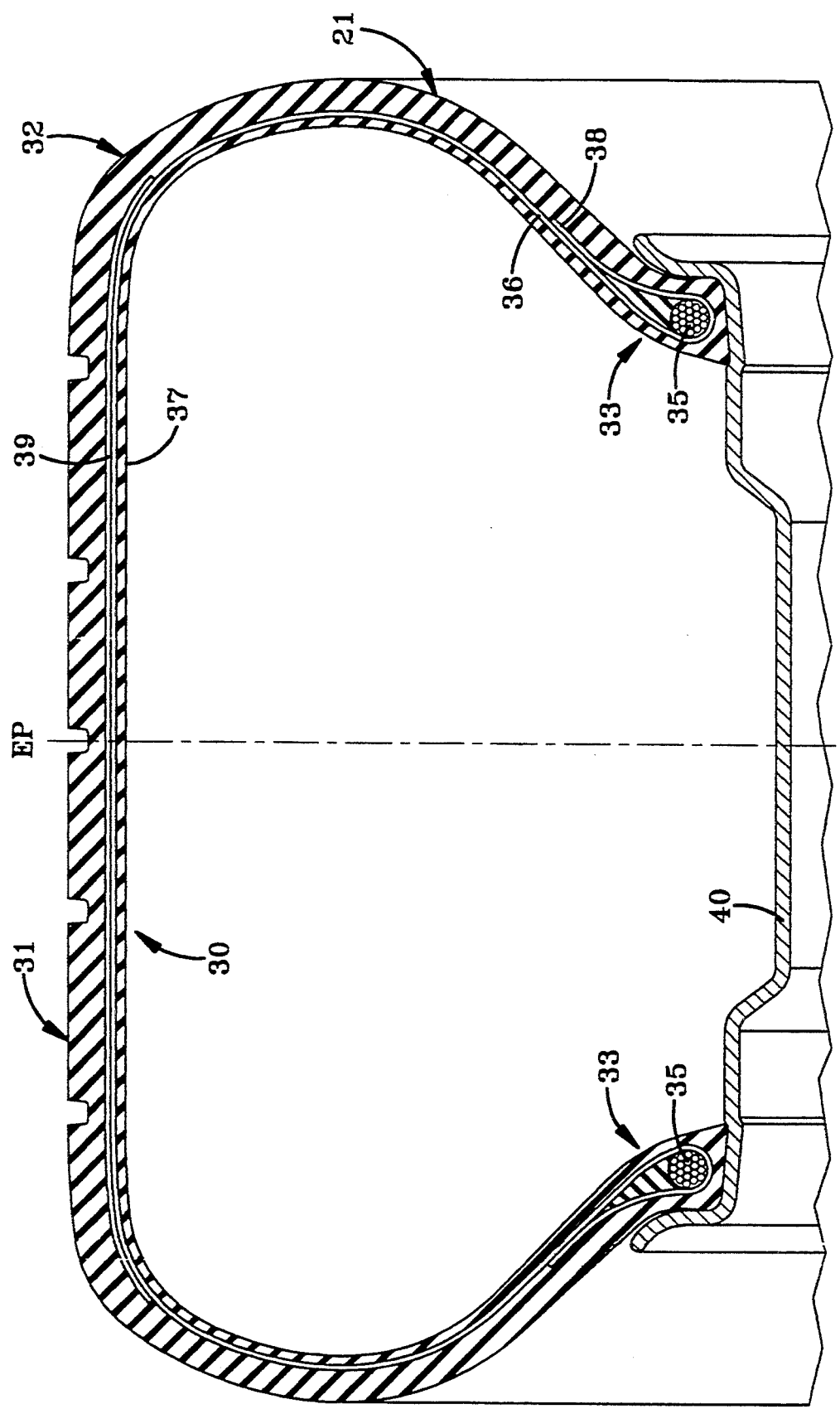
FIG. 5A depicts the tire mounted and uninflated.

After having mounted the tire 30 on the rim, the inclination of the bead portions 33 of the tire is imposed by the rim. As shown in FIG. 5, the tire sidewall 121 upon inflation takes a rounded shape due to the twist imparted to the bead by the rim 40 and due to the inflation pressure. As shown in FIG. 5A, the mounted tire when uninflated has the lower sidewall 21B almost flat and approximately inclined at an angle greater than 0.

Figure 8:
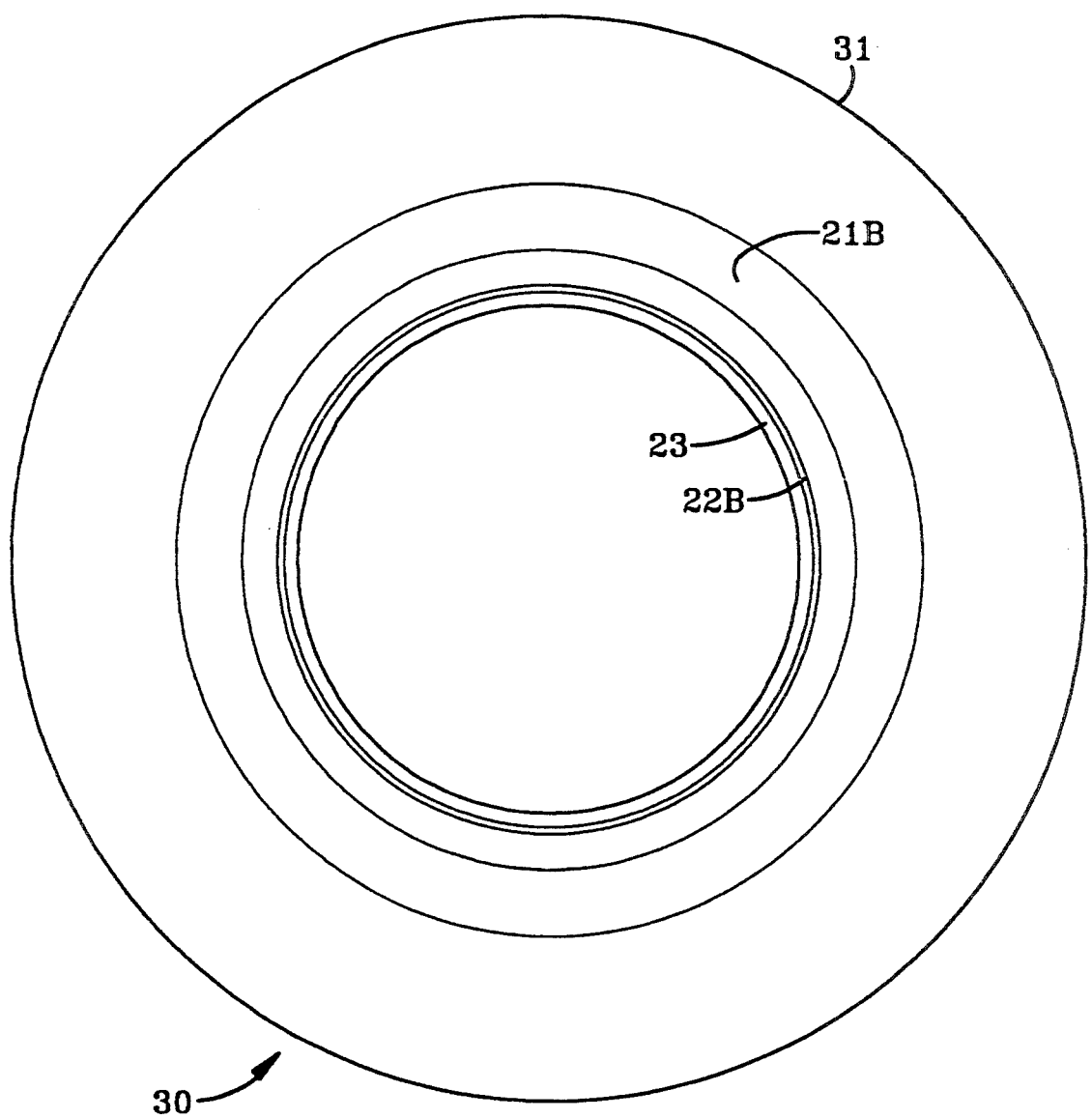
FIG. 8 is a side view of the tire as shown in FIG. 1.

In FIG. 8, a side view of an uninflated and unmounted tire according to the invention has been represented. Identical portions of the tire bear the same reference numbers as those used with respect to FIG. 1. It can be distinguished that the lower exterior sidewall portion 21B defines roughly a truncated cone.

Figure 2:
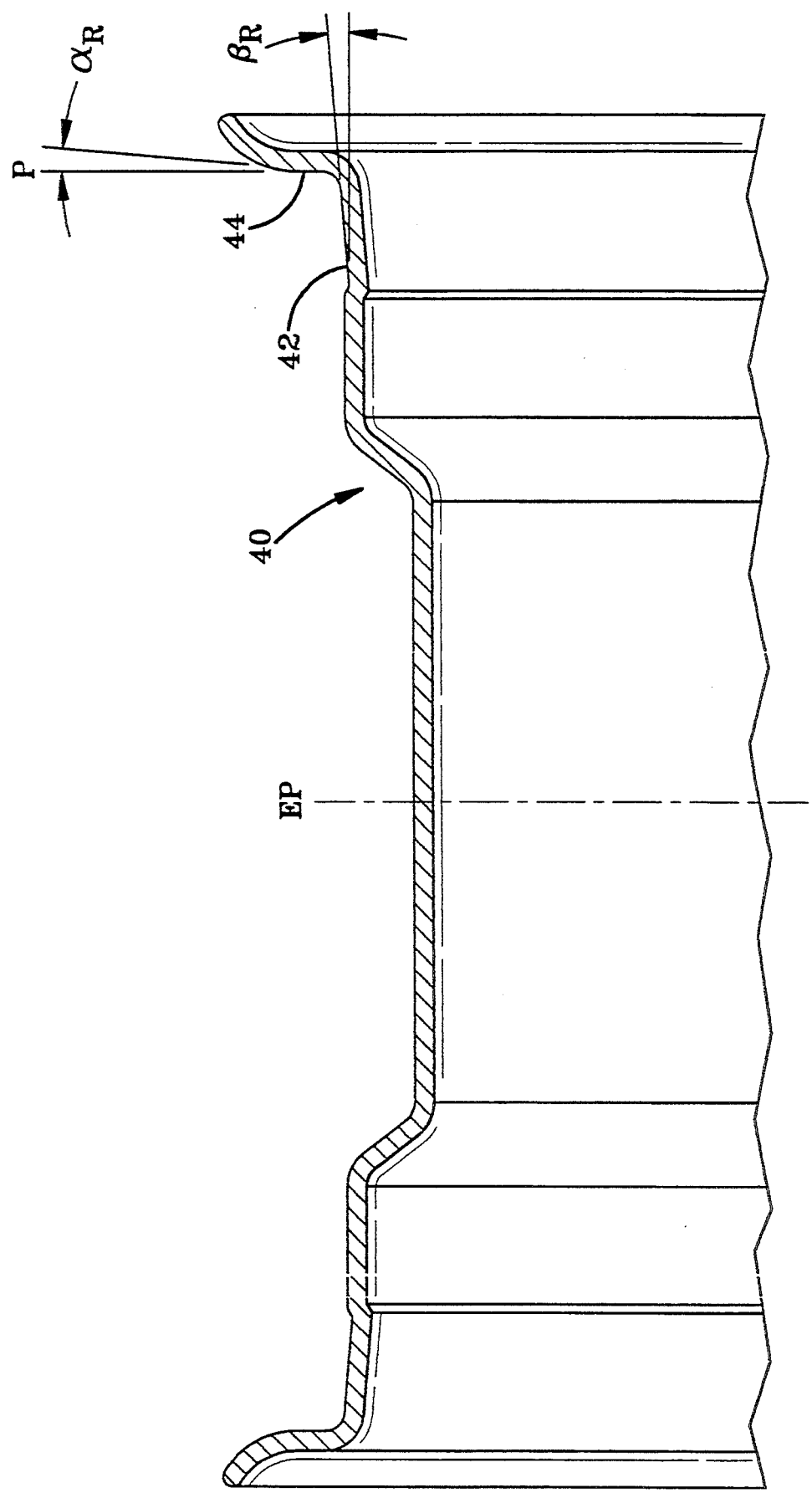
FIG. 2 is a cross sectional view of a standard design rim.

In FIG. 2, a design rim 40 having a bead seat 42 inclined at an angle $\beta_R$ relative to the axis of rotation and a flange 44 oriented at an angle $\alpha_R$, $\alpha_R$ being substantially perpendicular to the axis of rotation is shown. The angle $\beta_R$ is nominally 5° as shown.

Figure 3:
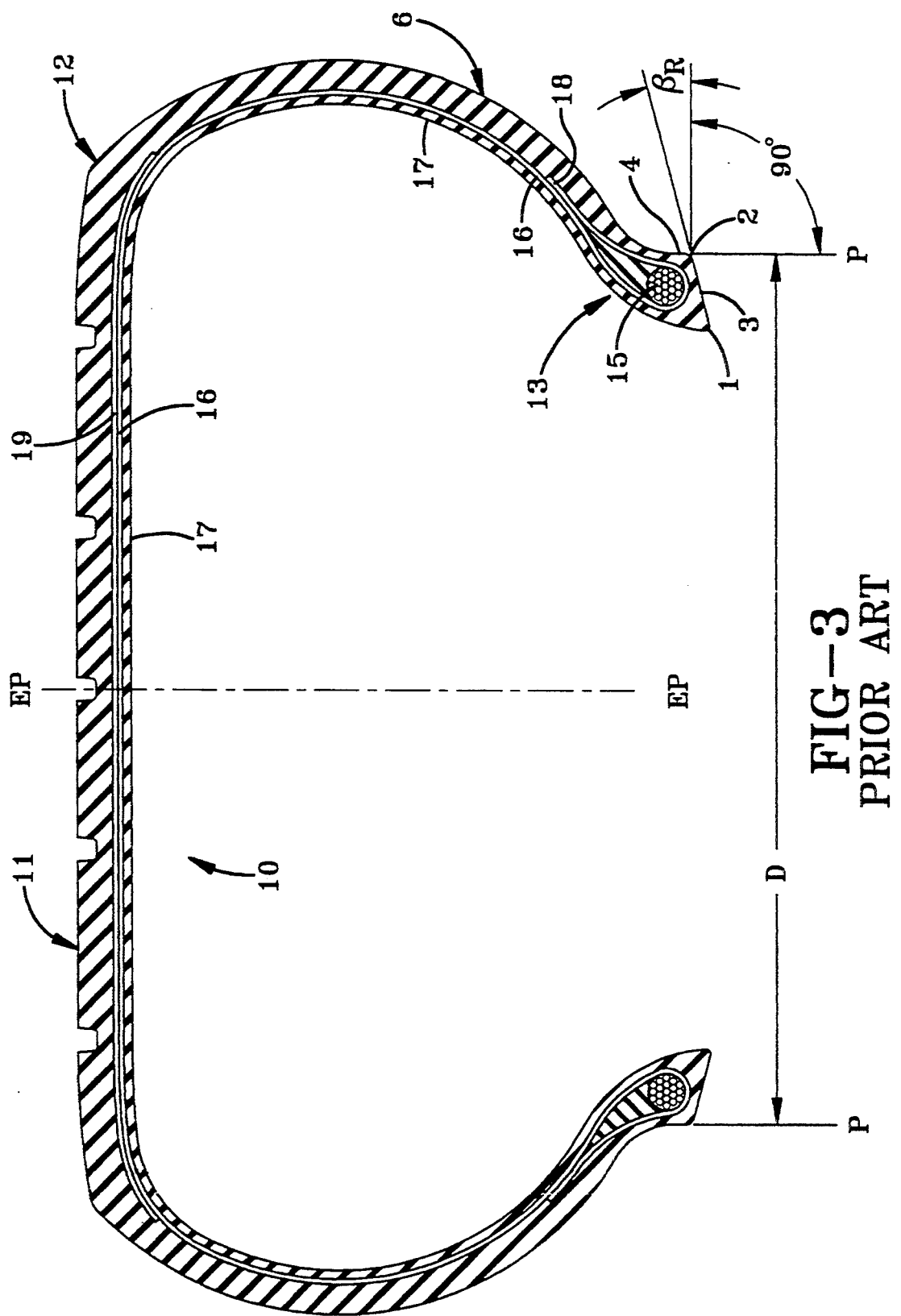
FIG. 3 is a cross sectional view of a prior art tire.

FIG. 3 illustrates a conventional prior art tire 10 having a pair of beads 13 with each bead having an annular tensile member 15, a reinforcing ply 16 wrapped about and extending from each of the tensile members 15, a radially outer tread 11, belt reinforcement 19 and a pair of sidewalls 6 extending from the tread 11 to the beads 13. As illustrated, the beads 13 when spaced to the design rim width D have an annular surface 3 extending between the bead heel 2 and toe 1, the annular surface 3 being oriented at an angle $\beta_R$ of about 5° or identical to the rim bead seat 42 orientation. Additionally, the prior art tire as illustrated has a radially outwardly extending surface 4, the surface 4 extending from the bead heel 2 and being oriented 90° to the axis of rotation.

Figure 4:
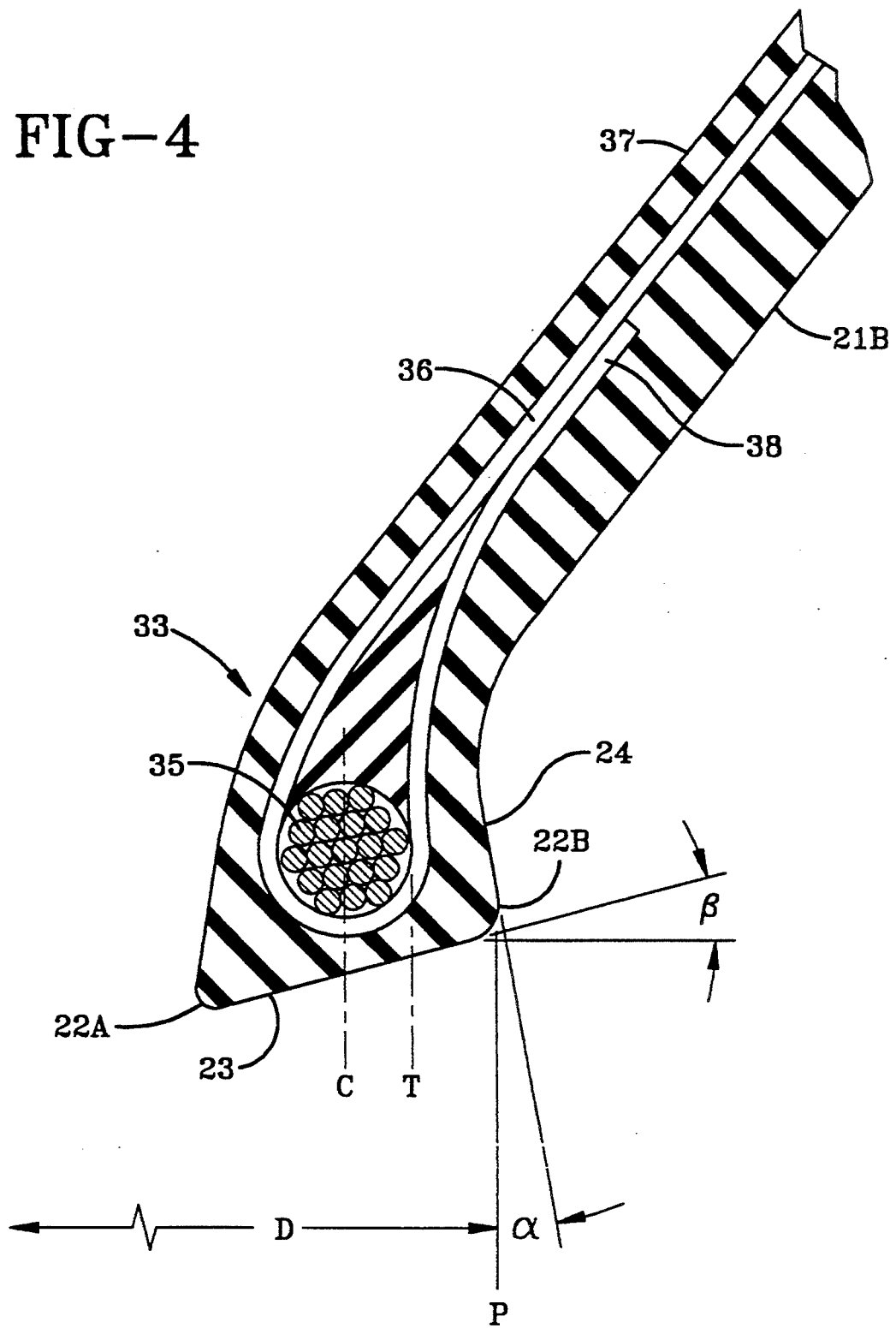
FIG. 4 is an enlarged cross sectional view of a bead taken along lines 4—4 of FIG. 1.

As shown in FIG. 4, an enlarged bead portion 33 made according to the present invention is positioned at the axially spaced distance equal to the design rim width D. Between the axially outer bead heel 22B and the axially inner bead toe 22A is a first annular surface 23. The first annular surface 23 is inclined at an angle $\beta$ relative to a line parallel to the axis of rotation of the tire 30. The angle $\beta$ is preferably in the range of 8° to 25°, more preferably between 8° and 20°. When mounted to the rim 40 having a $\beta_R$ inclination of 5°, an angular variation of at least 3° or greater exists, preferably about 5° angular variation.

To accommodate this angular variation, the tire 30 according to the present invention has a second annular surface 24 radially outwardly of the bead heel 22B. The second annular surface 24 is in contact with the annular flange portion 44 of the design rim 40 when the tire 30 is mounted and inflated to normal pressure. The second annular surface 24 is inclined relative to a plane P perpendicular to the axis of rotation, at an angle $\alpha$, $\alpha$ being in the range of 3° to 20° less than the angle formed between the rim flange 44 and the plane P. Preferably $\alpha$ is substantially equal to the angular difference of the first annular surface $\beta$ minus the bead seat orientation of the rim $\beta_r$.

In order to precisely measure the bead surfaces, it is recommended that the unmounted and uninflated tire 30 have its beads 33 positioned at the specified design rim width of the tire. Next two reference points on the bead must be established the two points being in the same cross sectional plane. The first point is suggested to be at the bead toe 22A and the second point anywhere along the second annular surface. By measuring the distance from the axis of rotation of the tire, a reference line has been established. The tire bead being reasonably dimensionally stable can be cut from the tire in cross sections such that the two marked reference points are in the same plane. By reestablishing the reference line, the same orientation of the annular tire with its bead located at the design rim width is achieved when the two reference points are positioned the exact radial distance above the reference line. It should be noted the reference line may be at the axis of rotation or any convenient line parallel to the axis and lying in a plane between the axis and the two reference points.

Once the dimensional reference is reestablished, the exact orientation of the annular first and second surfaces 23 and 24 can be measured. This method of measurement may be further enhanced by employing a comparitor which enlarges the bead cross section and facilitates more accurate measurements. The measurement techniques are known in the art and can lead to very accurate measurement, even of elastomeric composite articles such as tires.

Figure 6:
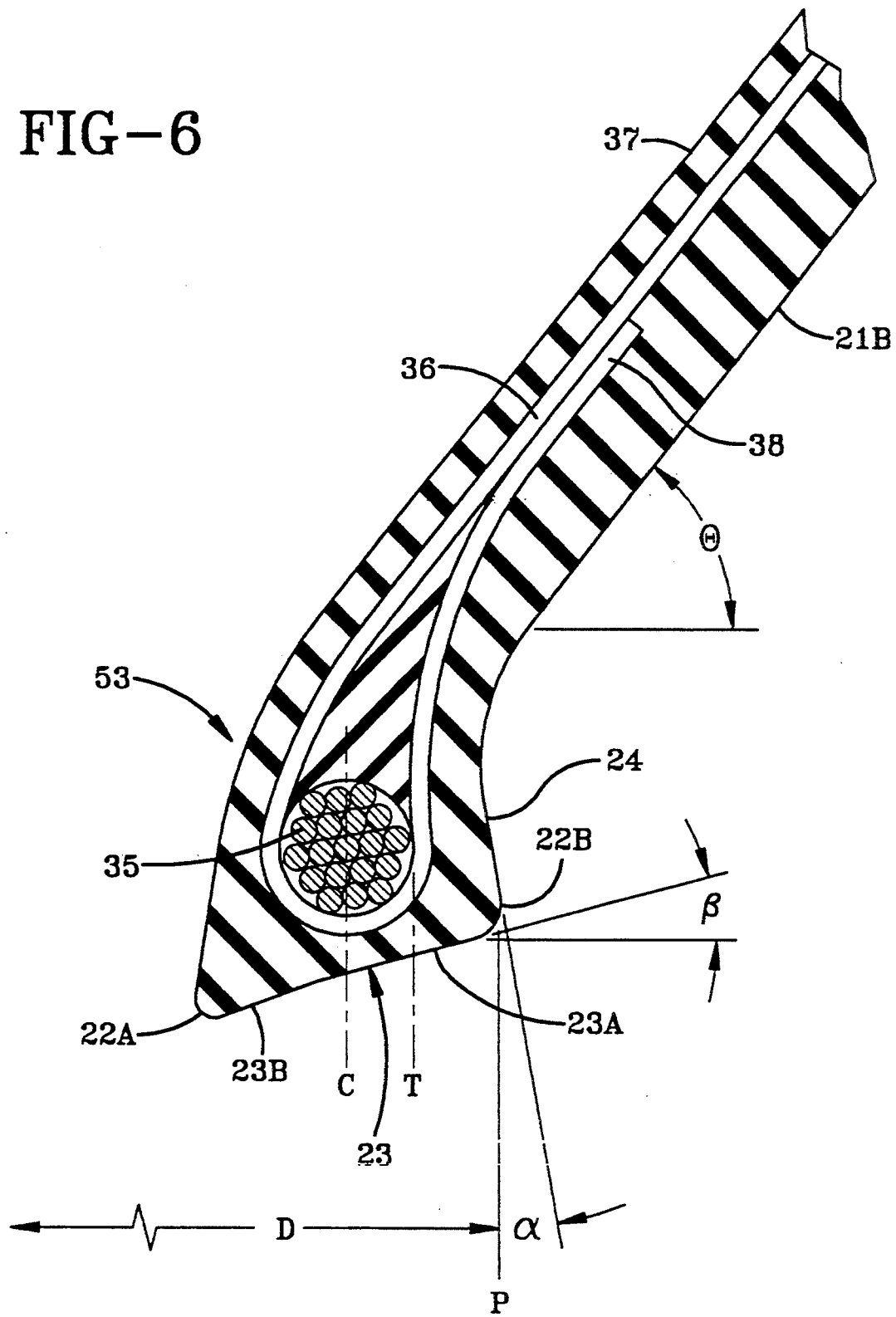
FIG. 6 is a cross sectional view of the preferred bead according to the present invention.

In FIG. 6 a cross sectional view of a preferred alternative bead configuration is shown made according to the present invention. The alternative bead 53 is similar to the bead 33 of FIG. 4; however, it employs a first annular surface 23 formed by an axially inner portion 23B adjacent the bead toe 22A and an axially outer portion 23A adjacent to the axially inner portion 23B, The axially inner portion 23B is inclined at an angle greater than the axially outer portion 23A. The axially outer portion 23A having an average angle $\beta$ in the same range as that described in the design of FIG. 4. The axially inner portion 23B has an angular orientation of $\beta$ plus 5° preferably. The bead 53 of FIG. 6 also has a second annular surface 24 having an angular orientation $\alpha$ also as described in the embodiment shown in FIG. 4.

As illustrated in FIG. 6, a portion of the first annular surface 23, when the tire beads are at the design rim width D, is located between a plane C and a plane T. Plane C is perpendicular to the axis of rotation of the tire and passes through the center of the annular tensile member. Plane T is tangent to the axially outer side of the annular tensile number and perpendicular to the axis of rotation of the tire. As illustrated, the axially outer portion 23A occupies the area between plane C and plane T.

Figure 7:
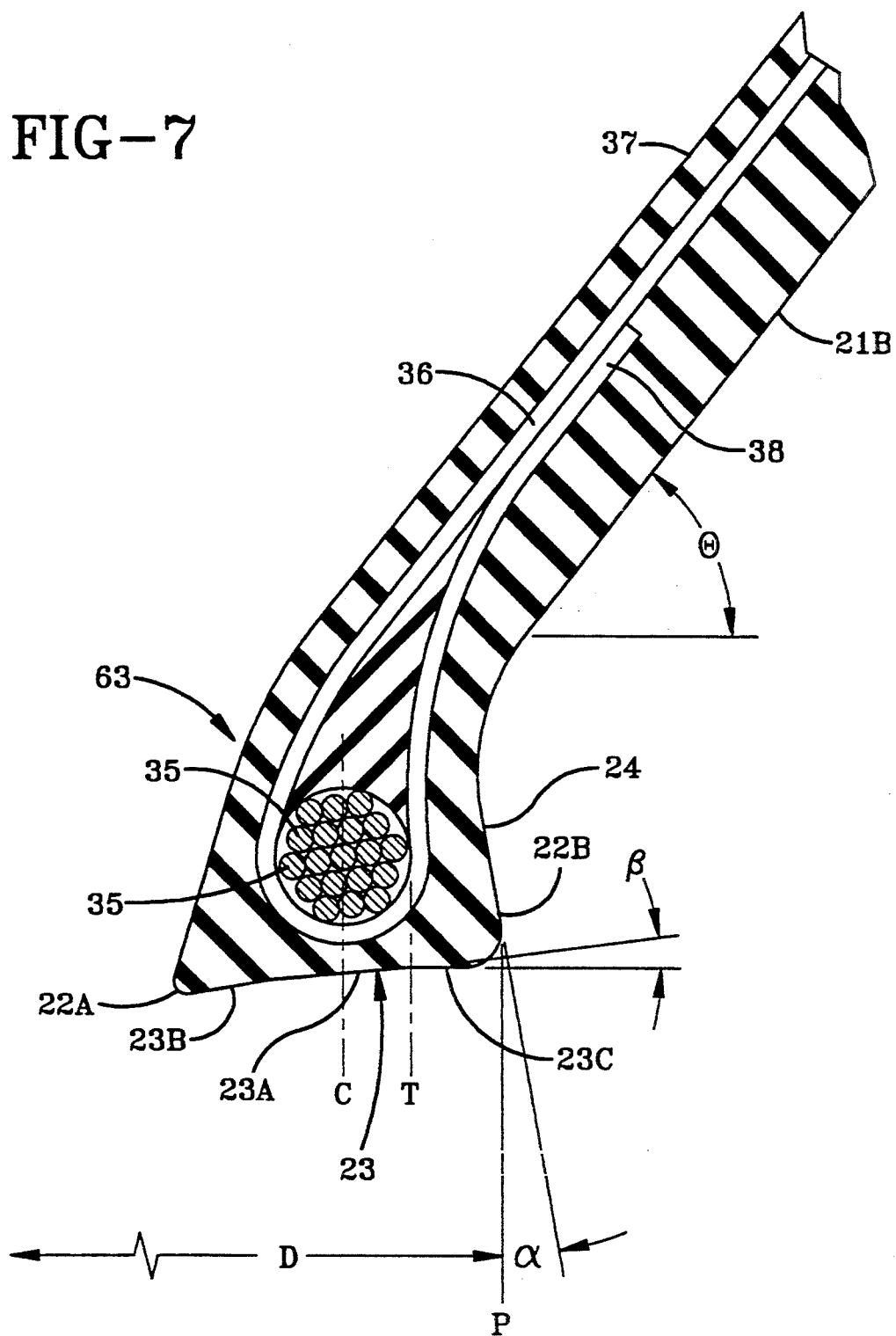
FIG. 7 is a cross sectional view of a second alternative bead according to the present invention.

In FIG. 7 a third embodiment 63 is illustrated. The third embodiment has a radially inner surface 23 between the bead toe 22A and the bead heel 22B. The radially inner first surface 23 has at least three distinct surfaces or portions, a first portion 23B located adjacent the bead toe 22A, a second portion 23A extending between the surface 23B adjacent the bead toe 22A and a third portion 23C near the bead heel 22B. In this embodiment 63, the second portion 23A extends into the area defined by planes C and T. Planes C and T are as defined above. When the tire 30 of this third embodiment 63 is unmounted and its beads are positioned to the design rim width D, the first annular surface 23 will have an average inclination $\beta$ greater than 3° that of the bead seat 42 of the rim 40 relative to the axis and the first 23B and second portions 23A as shown will have an average inclination of at least 3° greater than the design rim width, whereas the third portion 23C may be equal to or less than the design rim bead seat angle.

As illustrated in FIG. 1, the tire 30 has a pair of sidewalls 21. One sidewall 21 extends from each bead portion toward the radially outer tread. The maximum axial distance between the sidewalls defines the maximum section width of the tire. The sidewall 21A radially above the location of the maximum section width is the upper sidewall portion 21A, the sidewall portion radially below the maximum section width is the lower sidewall 21B. The lower sidewalls 21B are of substantially constant thickness (T) and have a radius of curvature (R) in the range of 100% of the maximum section width to ∞ over a majority of its length. In the preferred embodiment, the radius of curvature R approaches ∞ thereby forming a straight or flat sidewall over a majority of its length, the resultant shape of the lower sidewall 21B being conical in the tire's unmounted state. The conical surface forms an included angle $\theta$ in the range of 30° to 60° relative to the axis of rotation of the tire, preferably 45°.

Table 1 shows results of tires of the dimension 195/65 R15 shaped and vulcanized in molds according to the invention (tire A) and of tires shaped and vulcanized in prior art molds (tire B). Before the shaping and vulcanization step the different tires were, apart from the normal building tolerances, identical.

TABLE 1

| Test Parameter | Tire A | Tire B |
| --- | --- | --- |
| Comfort | 120 | 100 |
| Rolling resistance | 107 | 100 |
| High speed | 100 | 100 |
| Handling | 105 | 100 |

Table 1 demonstrates that a tire made according to the present invention had marked improvement in comfort, handling and rolling resistance without loosing any high speed performance.

While certain representative embodiments and details have been shown for the purpose of illustrating the invention, it will be apparent to those skilled in this art that various changes and modifications may be made therein without departing from the spirit or scope of the invention.

What is claimed:

1. An improved radial-ply pneumatic passenger tire having an axis of rotation, and a pair of axially-spaced beads respectively including an annular tensile member, and at least one radial ply extending between the annular tensile members of the respective beads, a reinforcing belt structure disposed radially outwardly of the at least one ply, the beads each having a heel portion and a toe portion designed to engage a design rim having bead seat and a design rim width, the design rim having a bead seat angle $\beta_R$ of about 5° relative to the axis of rotation, the improved tire being characterized by a first annular surface between the heel and toe of each bead and a second annular surface radially outwardly from each bead heel, the first annular surface being in contact with the bead seat of the design rim when the tire is mounted and inflated to normal pressure, the first annular surface, when the tire is unmounted, forming an average angle $\beta$ with the axis of the tire, when the beads are axially spaced a distance equal to the design rim width, that is at least three degrees greater than the angle formed between the mating bead seat of the design rim and the axis of the tire, and the second annular surface being in contact with an annular flange of the design rim when the tire is mounted and inflated to normal pressure, the second annular surface of the unmounted tire being inclined, relative to a plane P perpendicular to the axis of rotation, at an angle $\alpha$ at least three degrees less than the angle formed between the rim flange and the plane P perpendicular to the axis of rotation, the angle $\alpha$ being substantially equal to the angular difference of the first annular surface $\beta$ minus the bead seat angle $\beta_R$ of about 5°, the second annular surface forming a clearance fit relative to the rim in which upon assembly and inflation the tire beads rotate such that the second surface contacts the rim flange, the improved radial ply pneumatic tire having a pair of sidewalls, one sidewall extending from each bead portion toward a radially outer tread, the maximum axial distance between the sidewalls defining the maximum section width of the tire, the sidewall radially above the location of the maximum section width being the upper sidewall, the sidewall radially below the location of the maximum section width being the lower sidewall, the pair of lower sidewalls being of substantially constant thickness and over a majority of its length forming a conical surface in the tire's unmounted state.

2. The improved radial-ply pneumatic passenger tire of claim 1 wherein a portion of the first annular surface., when the tire beads are at the design rim width, is located in each bead between a plane C, perpendicular to the axis of the tire and passing through the center of the annular tensile member; and a plane T tangent to the axially outer side of the annular tensile member and perpendicular to the axis of rotation of the tire.

3. The improved radial-ply pneumatic passenger tire of claim 1 wherein the angle $\beta$ of the first surface is in the range of 8° to 25° relative to a line parallel to the axis of rotation.

4. The improved radial-ply pneumatic passenger tire of claim 3 wherein the angle $\beta$ of the first surface is about 5° greater than the angle formed between the mating bead seat of the design rim and a line parallel to the axis of the tire.

5. The improved radial ply pneumatic passenger tire of claim 2 wherein the angle $\alpha$ of the second surface is in the range of 3° to 20° relative to the plane P.

6. The improved radial-ply pneumatic passenger tire of claim 1 wherein the conical surface forms an included angle in the range of 30° to 60° relative to the axis of rotation of the tire.

7. The improved radial-ply pneumatic passenger tire of claim 6 wherein the conical surface is inclined 45° relative to the axis of rotation.

* * * * *